C. L. PECK.
SEDIMENTATION APPARATUS.
APPLICATION FILED OCT. 5, 1918.
1,337,094. Patented Apr. 13, 1920.
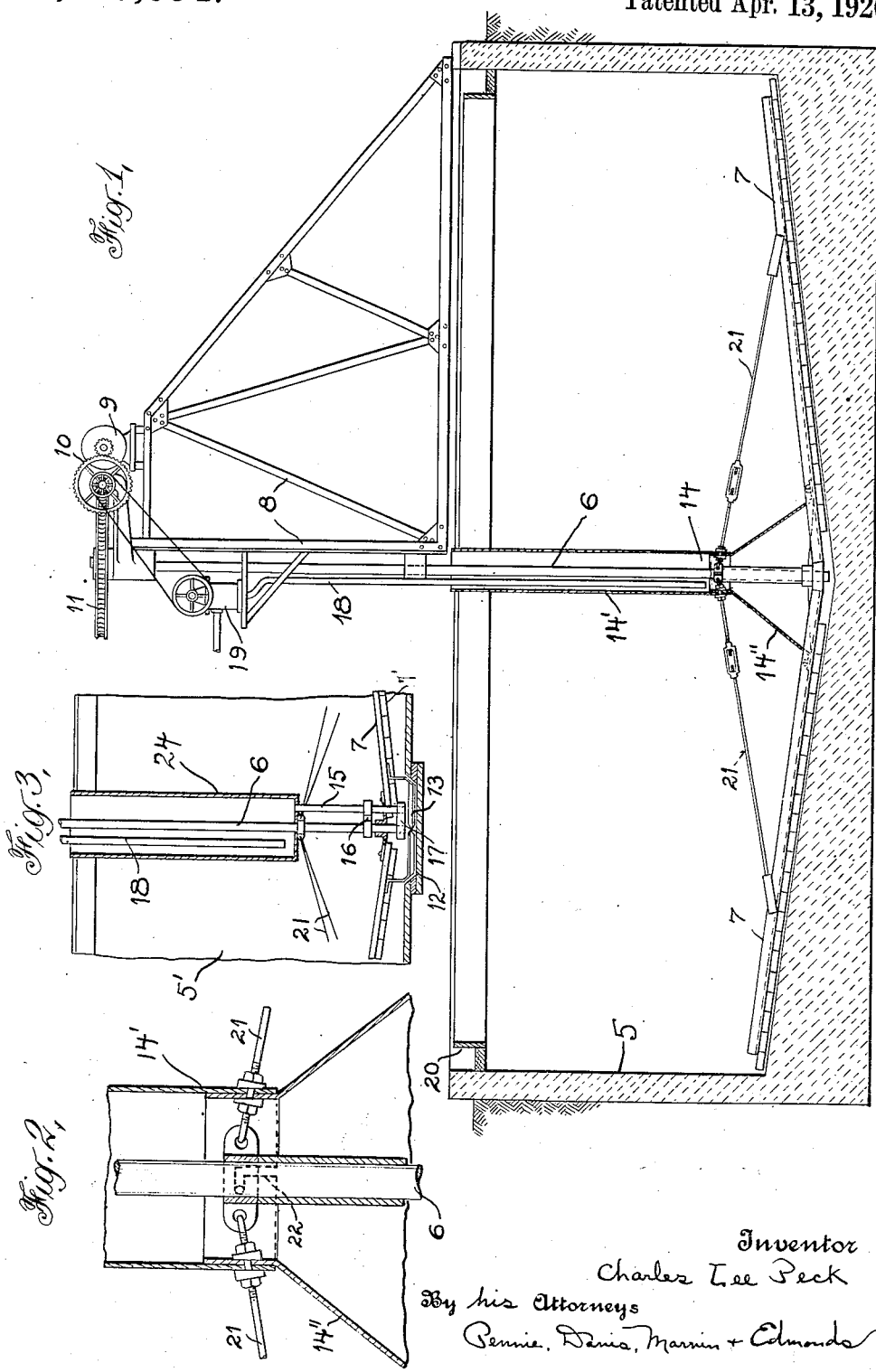
Inventor
Charles Lee Peck
By his Attorneys
Pennie, Davis, Marvin + Edmonds

UNITED STATES PATENT OFFICE.

CHARLES LEE PECK, OF NEW YORK, N. Y., ASSIGNOR TO THE DORR COMPANY, A CORPORATION OF DELAWARE.

SEDIMENTATION APPARATUS.

1,337,094.

Specification of Letters Patent.

Patented Apr. 13, 1920.

Application filed October 5, 1918. Serial No. 256,969.

*To all whom it may concern:*

Be it known that I, CHARLES LEE PECK, a citizen of the United States, residing at New York city, in the county of New York, State of New York, have invented certain new and useful Improvements in Sedimentation Apparatus; and I do hereby declare the following to be a full, clear, and exact description of the invention, such as will enable others skilled in the art to which it appertains to make and use the same.

This invention relates to sedimentation apparatus and has for its general object the provision of certain improvements in the structure of such apparatus for conveniently withdrawing the sediment or sludge collecting therein. The invention particularly relates to sedimentation apparatus in which a revolving mechanism is provided, and more especially suspended in the sedimentation tank or basin, for the collection of the sediment or sludge, and in this connection the aim of the invention is the provision of an improved arrangement for upwardly withdrawing the sediment or sludge collected by such mechanism without interfering with the operation thereof.

Sedimentation apparatus are frequently used under circumstances or conditions precluding the withdrawal downwardly, as by gravity, of the thickened sediment or sludge. Thus, in the treatment of trade effluents and sewage, it is often necessary or desirable to place the sedimentation basin or tank in an excavation or pit in the ground, in which case it becomes impracticable to withdraw the thickened sludge downwardly, and suitable means must accordingly be provided for withdrawing the sludge upwardly and over the side or top of the basin. Such upward withdrawal of the sludge presents increased difficulties when the material under treatment contains bulky solids, such as bottles, tin cans, pieces of clothing, and the like, any of which articles are likely to find their way into the sedimentation basin when treating sewage or trade effluents.

The improvements of the present invention are particularly adapted for sedimentation apparatus when used under such circumstances or conditions as just mentioned, and in this connection the invention contemplates the provision of a simple and convenient arrangement for upwardly withdrawing from the bottom of the basin the sediment or sludge collected by a revolving mechanism operatively suspended therein, without interfering with the normal operation of the mechanism and without occasioning any unreasonable interruption of the sludge withdrawal as a result of the presence in the basin of such bulky and foreign solids as previously mentioned.

In carrying out the invention, I provide within the sedimentation tank or basin a sludge well which is preferably open at the top and bottom and communicates with the sludge collecting in the tank. Although I prefer to construct the sludge well with an open bottom which extends into proximity with the bottom of the tank and into communication with the sludge collecting in the tank, the sludge well may be closed at the bottom and may be in communication with the sludge collecting in the tank through a depending conduit, as specifically described and claimed in my copending application Ser. No. 256,970, filed November 17, 1918. The level of the sludge in the well is maintained sufficiently low to induce a flow of sludge from the tank into the well as a result of the difference in hydrostatic head of the material outside the well and the sludge in the well. The necessary difference in hydrostatic head for inducing the desired flow of sludge from the tank into the well is maintained by withdrawing sludge from the well, and such withdrawal of sludge can be effected in any suitable manner, as by a bucket elevator, pump, or the like. In its complete and preferred form, the sludge well surrounds the axis of rotation of the revolving sludge collecting mechanism and is secured thereto and hence rotates therewith.

The novel features of the invention which I believe to be patentable are definitely set forth in the claims appended hereto. These features, together with the construction and mode of operation of an apparatus embodying the same, will be understood from the following description taken in conjunction with the accompanying drawings, in which—

Figure 1 is a sectional elevation of a sedimentation apparatus embodying the invention; Fig. 2 is a fragmentary view illustrating certain details of the construction of the apparatus of Fig. 1, and Fig. 3 is a sectional elevation of a modified form of the apparatus.

As illustrated in Fig. 1 of the accompanying drawings, my improved sedimentation apparatus comprises a sedimentation tank or basin 5. As represented in this figure, the sedimentation tank is set or built in an excavation or pit in the ground, the ground level being only slightly lower than the top of the tank. When treating sewage and trade waste waters, it is generally desirable or necessary to thus arrange the sedimentation tank below the ground and water level, and in such cases the provision of piping or moving parts beneath the basin is impracticable.

The sedimentation basin is represented in Fig. 1 of the drawings as constructed of concrete or cement. It will of course be understood, however, that the basin may be constructed of any material suitable for the liquors to be treated therein. As represented in Fig. 1, the bottom of the basin slopes gradually toward the center, but I wish it to be understood that this is not an essential feature of the apparatus, since the bottom may be substantially flat, as is now generally the practice in sedimentation basins and thickeners of this general type.

A revolving sludge-collecting mechanism is operatively suspended in the tank 5. This mechanism comprises a central vertical shaft 6, to the lower end of which are secured radial arms 7 equipped with plows 7' for bringing the sediment or sludge toward the center of the basin by the slow rotation of the mechanism. Radial supporting rods or stays 21 are secured at their inner ends to the shaft 6, and at their outer ends to the arms 7, and serve to support the arms 7 in suitable spaced relation with the bottom of the tank 5.

The shaft 6 is rotatably supported by a suitable framework 8 mounted above the top of the tank 5. The shaft may be rotated in any suitable manner, and in the accompanying drawings I have shown an electric motor 9 mounted on the framework 8 and connected by the reduction gearing 10 to a worm wheel 11 secured to the shaft 6. The revolving sludge-collecting mechanism is thus suspended in the tank 5, and, being entirely supported above the top of the tank, all parts of the mechanism are readily accessible for inspection and repair.

Surrounding the shaft 6, and concentric therewith, is a sludge well 14 having a substantially cylindrical upper portion 14' extending slightly above the top of the tank 5, and a downwardly flared or conical lower portion 14" resting on the radial arms 7. The lower end of the cylindrical member 14' is telescoped over a cylindrical collar on the upper end of the conical member 14", and the adjacent portions of these two members are secured to the supporting rods 21. As illustrated in Fig. 2 of the drawings, the cylindrical member 14' is mounted on the supporting rods 21 by means of bayonet joints 22, which facilitate the assembling and removal of this member. The sludge well is by this construction rigidly and firmly secured to the revolving mechanism, and there is little or no danger of the well becoming dislocated during the normal operation of the apparatus.

The sludge well 14 is in communication through its enlarged open bottom with the sludge worked toward the center of the tank by the revolving mechanism. The top of the sludge well is preferably open, so that any bulky objects finding their way into the well may be grappled from above and removed. Being open at the top, it will further be observed that the atmospheric pressure on the sludge in the well is the same as the atmospheric pressure on the material in the tank and outside the well, of which circumstance I take advantage in inducing a flow of sludge from the tank into the well, as will now be described.

In accordance with the present invention, the level of the sludge in the well 14 is maintained sufficiently low to provide a difference in hydrostatic head between the material outside the well and the sludge in the well for inducing a flow of sludge from the tank into the well. To this end, any suitable means may be provided for upwardly withdrawing the sludge from the well 14. In the accompanying drawings, I have shown a sludge pipe or conduit 18 depending vertically into the sludge well. As represented in Fig. 1 of the drawings, the sludge pipe 18 extends substantially to the point where the supporting rods 21 are attached to the shaft 6. A diaphragm pump 19 is operatively connected to the pipe 18 for pumping the sludge from the well. In the drawings, I have shown the pump 19 operatively connected to the electric motor 9, but it will, of course, be understood that the pump may be driven in any suitable manner.

In the operation of the apparatus, the clear liquor overflows into a peripheral launder 20, and may be withdrawn in any convenient manner. The sediment or sludge is worked toward the center of the sedimentation tank by the plows attached to the slowly rotating arms 7 of the sludge-collecting mechanism. When the level of the sludge in the well 14 is sufficiently lowered by withdrawing sludge therefrom by means of the pump 19, a difference in hydrostatic head is effected between the inside and the outside of the well. This causes the sludge to flow underneath the lower edge of the conical member 14" into the sludge well, and this flow continues until a balance in hydrostatic head is effected. By continuously withdrawing the sludge from the well 14, a continuous flow of sludge from the tank into the well is effected. Thus, the sediment or sludge collecting on the bottom of the tank 5 is forced by the hydrostatic head of the material in the tank 5 into the well 14, from whence the sludge is upwardly withdrawn by the pump 19. Continuous operation is obtained by maintaining a sufficient difference in hydrostatic head between the material outside the sludge well and the sludge in the well to induce a continuous flow of sludge from the tank underneath the lower edge of the conical member 14″ and into the well.

In Fig. 3 of the drawings, I have illustrated a slightly modified form of the invention; whereas in the apparatus of Fig. 1, the sludge well is open at the bottom, in the modification represented in Fig. 3, the sludge well is closed at the bottom, and takes the form of a cylindrical receptacle or well 24. The bottom of the sludge well 24 is positioned just above the attachment of the supporting rods 21 to the shaft 6. The top of the well 24 is open and is positioned at a slightly higher level than the top of the tank 5.

The sedimentation tank or basin 5′ represented in Fig. 3 of the drawings has a substantially flat bottom, as distinguished from the centrally sloping bottom of the tank 5 of Fig. 1. The bottom of the tank 5′ is provided with a relatively shallow circular depression or pit 12. A scraper 13 is suitably secured to the radial arms 7 and depends into the depression 12, and by its rotation with the revolving mechanism prevents material from packing in the depression.

A conduit or pipe 15 communicates with the sludge well 24 through the bottom thereof and depends vertically from the well into proximity with the bottom of the tank. The conduit 15 is eccentrically positioned with respect to the rotatable shaft 6, and thus moves in a circular path about the axis of the shaft. Near its lower end, the conduit 15 is suitably spaced from and secured to the shaft 6 by a plate 16. A deflector or plow 17 is secured at the bottom of the shaft 6 and is positioned slightly in advance of the conduit 15 with respect to the direction of rotation of the revolving mechanism. The deflector 17 is shaped so as to move bulky solids outward beyond the path of the conduit 15, where such solids become accessible from above and may be conveniently removed so as not to interfere with the normal functions of conduit 15.

The operation of the apparatus illustrated in Fig. 3 is substantially the same as that of the apparatus illustrated in Fig. 1. Sludge is continuously withdrawn from the well 24 through the sludge pipe 18, so as to maintain a difference in hydrostatic head between the material outside the well and the sludge in the well, and for thereby inducing a flow of sludge through the conduit 15 from the bottom of the tank into the well. The eccentric arrangement of the conduit 15 is of particular advantage, since it enables the convenient removal of any obstruction finding its way therein. Thus, if the conduit 15 becomes closed by the entrance therein of a piece of clothing, or the like, too large to pass through the conduit, such obstruction can be very conveniently removed by emptying the receptacle 14 and forcing the obstruction out of the conduit from above. The conduit being a substantially straight pipe can be very conveniently cleaned from above by forcing a rod or brush through the same.

From the foregoing description, it will be evident that I have provided a sedimentation apparatus in which all operative parts are readily and conveniently accessible, both for inspection and repair. No operative elements of the apparatus are positioned beneath the bottom of the sedimentation tank, thus eliminating the necessity for stuffing boxes and parts moving one upon another underneath the surface of the solution or sludge, which objectionable arrangements are necessary in devices of the prior art, where the sludge is to be upwardly removed at the center. Bulky objects which may find their way into the sedimentation tank may be grappled from above and removed without unreasonably interrupting the continuity of service.

A very important advantage results from the use of the conically flared member 14″ in the apparatus of Fig. 1. Whatever sludge flows into the sludge well 14, or more generally to the sludge outlet of the apparatus, must pass beneath the enlarged lower edge of the member 14, thereby providing an increased area from which the sludge is withdrawn from the tank. By thus withdrawing the sludge from an increased area, as is effected by the flared member 14″, the velocity of the flow of the sludge is proportionately decreased, and any undue depression of the upper horizon of the sludge and "breaking through" of clear liquor is thereby prevented. Such an arrangement permits the withdrawal of relatively thick sludge when but a very small amount has been collected. The necessary period of detention of the sludge in the settling basin is thereby greatly reduced.

Where an orifice or outlet of small area is used for withdrawing the sludge from the tank, the velocity of the sludge flow tends to cause the supernatant liquor to be drawn in with the sludge, thus defeating the purpose of sedimentation. If the sludge is permitted to remain in the tank until a sufficient depth is collected over the discharging orifice to prevent what is known among sewage engineers as "breaking through," the sludge becomes septic and generates gases which cause the sludge to rise and destroy the quiescent condition necessary to effective sedimentation. The downwardly and outwardly flared member 14″ of my improved apparatus prevents this "breaking through" of the supernatant liquor, by materially increasing the area from which the sludge is withdrawn from the tank. At the same time, the member 14″ does not interfere with satisfactory sedimentation, and, due to its downwardly flared configuration, offers no opportunity for sludge to become piled up thereon. In treating putrescible materials, such as activated sludge, sanitary and municipal sewages, and the like, these matters are of great importance, and, as far as I am aware, have not heretofore been satisfactorily handled.

I claim:

1. A sedimentation apparatus comprising a tank, a revolving sludge well open at the top and communicating with the bottom of said tank and disposed within the tank and adapted to be substantially surrounded by the liquid material contained in the tank, and means for withdrawing sludge from said well so as to maintain a difference in hydrostatic head between the material outside said well and the sludge within the well and for thereby inducing a flow of sludge into said well through the bottom thereof.

2. A sedimentation apparatus comprising a tank, a sludge well within said tank communicating with the bottom thereof, said well having a definite sludge level lower than the level of the material in said tank, and means for maintaining the level of the sludge in said well sufficiently low to induce a flow of sludge from the tank into the well as a result of the difference in hydrostatic head of the material outside the well and the sludge in the well.

3. A sedimentation apparatus comprising a tank, a revolving sludge collecting mechanism operatively arranged within said tank for working the sludge toward a sludge collecting region, an open sludge well secured to said mechanism and communicating with said sludge collecting region, and means for withdrawing sludge from said well so as to maintain a difference in hydrostatic head between the material outside said well and the sludge within the well and for thereby inducing a flow of sludge from the tank into said well.

4. A sedimentation apparatus comprising a tank, a revolving sludge collecting mechanism operatively arranged within said tank, a sludge well within said tank communicating with the bottom thereof and secured to said mechanism, said well having a normal sludge level lower than the level of the material in said tank, and means for maintaining the level of the sludge in said well sufficiently low to induce a flow of sludge from the tank into the well as a result of the difference in hydrostatic head of the material outside the well and the sludge in the well.

5. A sedimentation apparatus comprising a tank, a revolving sludge collecting mechanism operatively suspended within said tank for working the sludge toward the center thereof, a sludge well arranged within said tank and secured to said mechanism surrounding the axis of rotation thereof and in communication with the sludge collected thereby, a pipe depending into said well, a pump operatively connected to said pipe, and motive means operatively connected to said pump and to said mechanism.

6. A sedimentation apparatus comprising a tank having at its bottom a centrally disposed circular depression, a revolving sludge collecting mechanism operatively arranged in said tank, a sludge well secured to said mechanism surrounding the axis of rotation thereof and in communication with the sludge collected thereby, means for withdrawing sludge from said well so as to maintain a difference in hydrostatic head between the material outside said well and the sludge within the well and for thereby inducing a flow of sludge from the tank into said well, and a scraper secured to said mechanism and arranged to rotate in said depression to prevent the packing of solids therein.

7. A sedimentation apparatus comprising a tank, a revolving sludge well within said tank, said well being open at the top and at the bottom and having a conically flared lower portion depending into proximity with the bottom of said tank, and means for withdrawing sludge from said well so as to maintain a sufficient difference in hydrostatic head between the material outside said well and the sludge in said well to induce a flow of sludge from said tank into the well.

8. A sedimentation apparatus comprising a tank, a revolving sludge collecting mechanism operatively arranged in said tank and having radially disposed arms, a sludge well open at the top and bottom arranged within said tank surrounding the axis of rotation of said mechanism and having a flared lower portion resting on said radial arms, and means for withdrawing sludge from said well so as to maintain a difference in hydrostatic head between the material outside said well and the sludge in said well and for thereby inducing a flow of sludge from said tank into the well.

9. A sedimentation apparatus comprising a tank, a revolving sludge collecting mechanism operatively arranged in said tank, a sludge well arranged within said tank surrounding the axis of rotation of said mechanism and secured thereto and communicating with the sludge collected thereby, a pipe depending into said well, and means associated with said pipe for upwardly withdrawing sludge therethrough and for thereby maintaining a sufficient difference in hydrostatic head between the material outside the well and the sludge in the well to induce a flow of sludge from the tank into the well.

10. A sedimentation apparatus comprising a tank, a revolving sludge collecting mechanism operatively suspended in said tank for working the sludge toward the center thereof, an open sludge well arranged within said tank surrounding the axis of rotation of said mechanism and secured thereto and communicating with the sludge collected thereby, a pipe depending into said well, and means associated with said pipe for upwardly withdrawing sludge therethrough and for thereby inducing a flow of sludge from the tank into the well by the difference in hydrostatic head of the material outside the well and the sludge in the well.

11. A sedimentation apparatus comprising a tank, a revolving sludge collecting mechanism operatively suspended in said tank for working the sludge toward the center thereof, an open sludge well including an upper cylindrical member extending above the top of said tank and surrounding the axis of rotation of said mechanism and a lower conically flared member depending into communication with the sludge collected by said mechanism and also surrounding the axis of rotation thereof, said well being secured to said mechanism and rotatable therewith, a pipe depending into said well, and a pump operatively connected to said pipe.

12. A sedimentation apparatus comprising a tank, a revolving sludge collecting mechanism operatively suspended in said tank and having radially disposed arms, an open sludge well including an upper cylindrical member extending above the top of said tank and surrounding the axis of rotation of said mechanism and a conically flared lower member resting on said radial arms and also surrounding the axis of rotation of said mechanism.

13. A sedimentation apparatus comprising a tank, a revolving sludge collecting mechanism operatively suspended in said tank for working the sludge toward the center thereof, means for withdrawing the sludge collecting in said tank, and a downwardly and outwardly flared member secured to said mechanism for increasing the area from which the sludge is withdrawn from said tank by said sludge withdrawing means.

In testimony whereof I affix my signature.

CHARLES LEE PECK.